United States Patent
Monnerat et al.

(10) Patent No.: US 10,924,159 B2
(45) Date of Patent: Feb. 16, 2021

(54) HOUSEHOLD ELECTRICAL SYSTEM COMPRISING TWO-WAY DATA TRANSMISSION BETWEEN A BASE AND AN APPLIANCE

(71) Applicant: LAURASTAR SA, Châtel-St-Denis (CH)

(72) Inventors: Christophe Monnerat, Russy (CH); Sylvain Decastel, Remaufens (CH); Laurent Seydoux, Gillarens (CH)

(73) Assignee: LauraStar S.A., Châtei-St-Denis (CH)

( * ) Notice: Subject to any disclaimer, the term of this patent is extended or adjusted under 35 U.S.C. 154(b) by 0 days.

(21) Appl. No.: 16/643,176

(22) PCT Filed: Aug. 10, 2018

(86) PCT No.: PCT/IB2018/056043
§ 371 (c)(1),
(2) Date: Feb. 28, 2020

(87) PCT Pub. No.: WO2019/043487
PCT Pub. Date: Mar. 7, 2019

(65) Prior Publication Data
US 2020/0220575 A1    Jul. 9, 2020

(30) Foreign Application Priority Data
Aug. 31, 2017  (EP) .................................... 17188726

(51) Int. Cl.
*H04B 3/54*  (2006.01)
*D06F 75/12*  (2006.01)
(Continued)

(52) U.S. Cl.
CPC ............. *H04B 3/542* (2013.01); *D06F 75/12* (2013.01); *D06F 75/26* (2013.01); *H04L 12/10* (2013.01); *H02J 7/0063* (2013.01)

(58) Field of Classification Search
CPC . H04B 3/54; H04B 3/542; H04B 3/56; H04B 2203/5416; H04B 2203/5483;
(Continued)

(56) References Cited

U.S. PATENT DOCUMENTS

2004/0032320 A1* 2/2004 Zalitzky .................. H04B 3/56
                                                            307/1
2008/0234534 A1* 9/2008 Mikas ....................... A61N 2/02
                                                            600/14
(Continued)

FOREIGN PATENT DOCUMENTS

EP    1 815 056    8/2007
FR    2 854 002    10/2004

OTHER PUBLICATIONS

International Search Report for PCT/IB2018/056043, dated Dec. 6, 2018, 4 pages.
(Continued)

*Primary Examiner* — Khanh C Tran
(74) *Attorney, Agent, or Firm* — Nixon & Vanderhye P.C.

(57) ABSTRACT

The invention relates to a household electrical system, for example for ironing, comprising an appliance, such as an iron, connected to a base by a cord made up of at least: —a first electrical line formed by a first set of conductive wires for high-voltage (HV) transmission of a heating power, —a second electrical line formed by a second set of conductive wires for the low-voltage (LV) power supply of an electronic board arranged in the appliance, —a third electrical line for providing two-way data transmission between the base and the appliance; characterised in that the third electrical line is formed by the second set of conductive wires; the system also comprising a modulator suitable for modulating the voltage and/or the current circulating in the second set of conductive wires, so as to activate the second electrical line (Continued)

Figure 1:
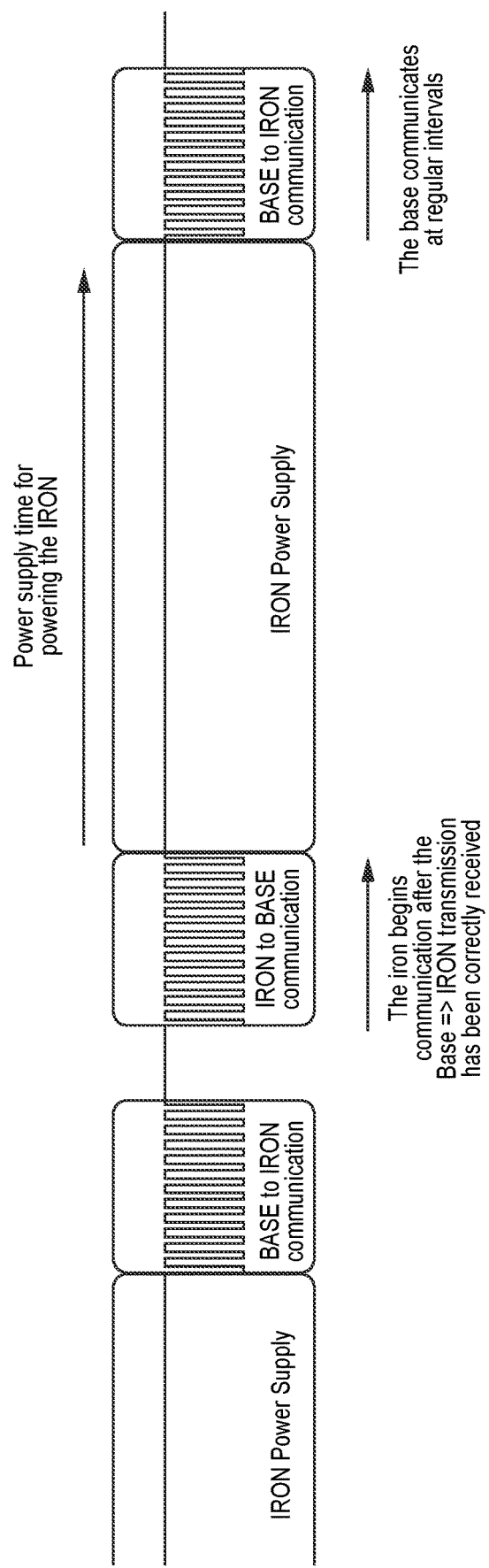

and the third electrical line or the third electrical line exclusively.

5 Claims, 3 Drawing Sheets

(51) Int. Cl.
*D06F 75/26* (2006.01)
*H04L 12/10* (2006.01)
*H02J 7/00* (2006.01)

(58) Field of Classification Search
CPC ....... H04L 2012/2843; H04L 2012/285; H04L 12/10; D06F 75/12; D06F 75/26
See application file for complete search history.

(56) References Cited

U.S. PATENT DOCUMENTS

| 2009/0084007 | A1 | 4/2009 | Liu | |
|---|---|---|---|---|
| 2009/0121825 | A1* | 5/2009 | Har | H04L 25/0266 340/3.1 |
| 2016/0224083 | A1* | 8/2016 | Dent | G06F 1/266 |

OTHER PUBLICATIONS

Written Opinion of the ISA for PCT/IB2018/056043, dated Dec. 6, 2018, 7 pages.

* cited by examiner

BASE Side

HOUSEHOLD ELECTRICAL SYSTEM COMPRISING TWO-WAY DATA TRANSMISSION BETWEEN A BASE AND AN APPLIANCE

This application is the U.S. national phase of International Application No. PCT/IB2018/056043 filed 10 Aug. 2018, which designated the U.S. and claims priority to EP Patent Application No. 17188726.8 filed 31 Aug. 2017, the entire contents of each of which are hereby incorporated by reference.

FIELD OF THE INVENTION

The invention relates to household electrical systems, in particular ironing systems, which comprise an appliance, for example an iron, connected to a base by a cord. More specifically, it relates to the two-way transmission of data along the cord.

PRIOR ART

In most existing ironing systems, the cord comprises a first electrical line formed by a set of conductive wires for the high-voltage (HV) transmission of the heating power and a second electrical line formed by another set of conductive wires for the low-voltage (LV) supply of power to a circuit board arranged in the iron, generally at the handle.

HV is intended to refer to a voltage required for heating the iron, for example 220 V AC.

LV is intended to refer to a voltage sufficient for supplying power to a circuit board or for providing two-way communication between the base and the iron, for example 5 V or 12 V DC.

When the base comprises a steam generator, the cord comprises a flexible hose for conveying the steam.

In some prior art systems, the user can change certain operating parameters of the generator, for example the pressure. However, these parameters are changed by acting directly on the generator, by activating buttons or potentiometers arranged thereon.

During this type of procedure, the user has to put down the iron or hold the iron in one hand and change the parameters of the generator with the other hand. In all cases, this kind of handling is awkward, indeed even dangerous.

In order to avoid these drawbacks and, more generally, in order to control the base directly from the iron, an additional electrical line can be added in the cord, said line being suitable for providing data transmission, generally two-way data transmission, between the base and the iron.

The patent EP 1 815 056 B1 and the patent application US 2009/084007 describe ironing systems in which the cord comprises a data transmission line.

Although the abovementioned systems operate correctly, they still require the presence of three sets of conductive wires and, where applicable, a hose for transmitting the steam.

In this type of configuration, the cord is relatively thick, bulky, and rather stiff. These features have the effect of impairing the handling of the iron.

DESCRIPTION OF THE INVENTION

The present invention makes it possible to overcome the abovementioned drawbacks.

To this end, it relates to a household electrical system and to a use such as are defined in the claims.

The invention thus relates to a household electrical system, for example for ironing, comprising an appliance, such as an iron, connected to a base by a cord consisting of at least:

a first electrical line formed by a first set of conductive wires for the HV transmission of a heating power, a second electrical line formed by a second set of conductive wires for the LV supply of power to a circuit board arranged in the appliance, a third electrical line for providing two-way data transmission between the base and the appliance;

characterized in that the third electrical line is formed by the second set of conductive wires; the system further comprising a modulator suitable for modulating the voltage and/or the current through the second set of conductive wires so as to activate the second electrical line and the third electrical line, or exclusively the third electrical line.

The fact that the second and third electrical lines use the same set of conductive wires makes it possible to reduce the diameter, and therefore the bulk, of the cord, and its stiffness.

The modulator is preferably designed to allow digital transmission of data, for example a succession of bits generated, for example, as follows: 12 V=1, 0 V=0.

According to one variant of the invention, the base comprises a steam generator. In this configuration, the cord comprises a flexible hose for supplying steam to the iron.

Alternatively or in addition, the base may contain a liquid tank. In this configuration, the cord comprises a flexible hose through which the liquid can flow.

The invention also relates to the use of a household electrical system such as is defined above, characterized in that data are transmitted from the base to the appliance and vice versa by means of the modulator.

The invention makes it possible to supply power to the electronics of the appliance without an HV needing to be transformed into an LV within said appliance. In the context of the present invention, this transformation is carried out in the base, preferably by means of a PCB and a current limiter. In order to transmit data, the base sends an item of information by modulating the voltage as indicated above. The appliance, for example the iron (see FIG. 1), then "responds" and gives orders to the base. During the response phase, power is supplied to the circuit board of the iron by a source of electricity arranged in the iron, for example a battery or a capacitor.

During the phase of transmission of the data through the second set of conductive wires (activation of the third electrical line), the "0" state is achieved, for example, by interrupting the voltage, while the "1" state is achieved by maintaining an LV (for example 12 V or 5 V).

FIG. 1 depicts the mode of operation of the second and third electrical lines along the second set of conductive wires.

A typical sequence takes place as follows:
1—Continuous supply of power to the circuit board of the iron with no communication for a defined period of time (second electrical line activated)
2—Initiation of communication by the base (activation of the third electrical line, second line still activated)
3—Once the communication has been correctly received, the iron responds directly (third electrical line activated, second electrical line deactivated)
4—Starting of a new cycle from step 1 described above.

Figure 2:
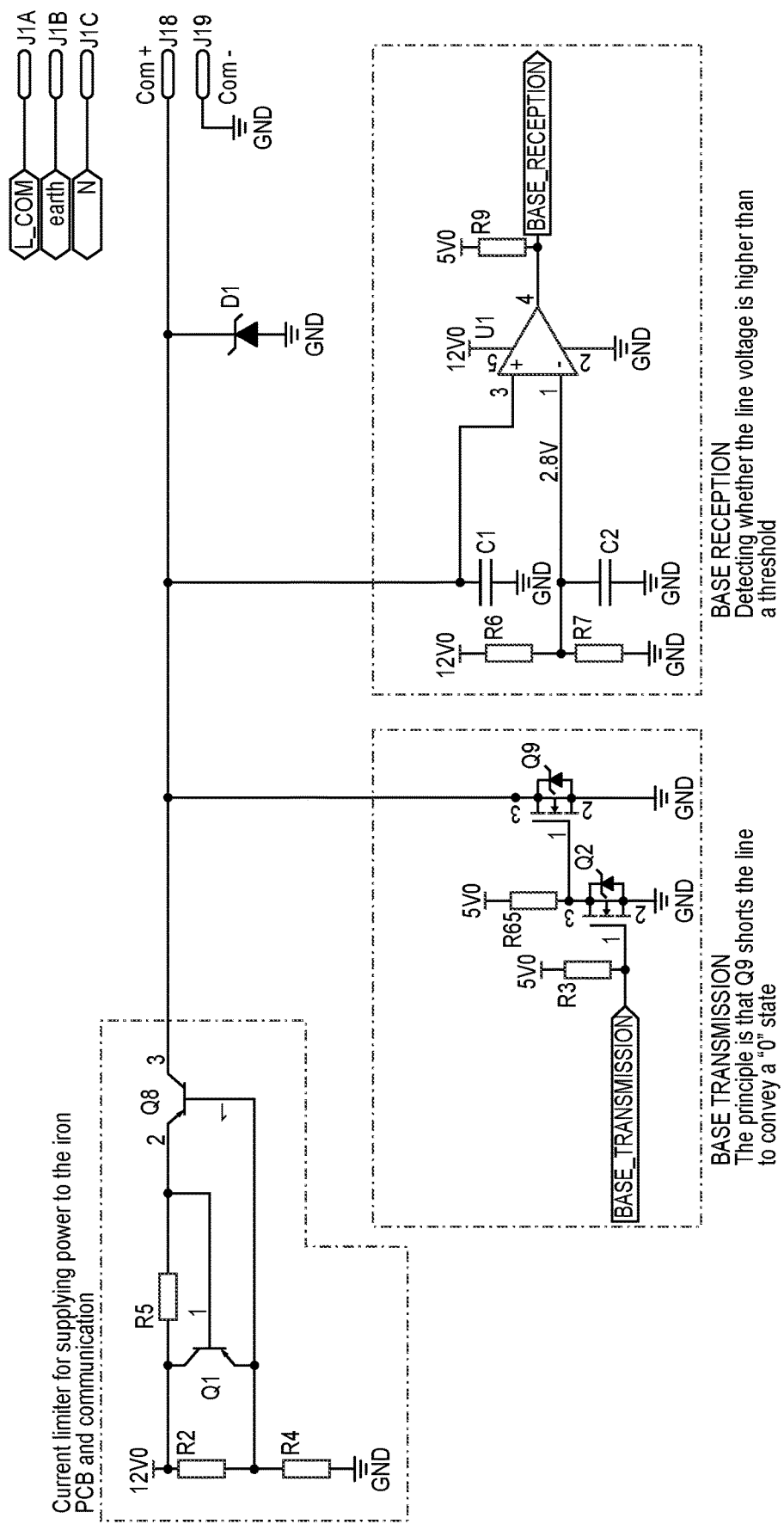
Figure 3:
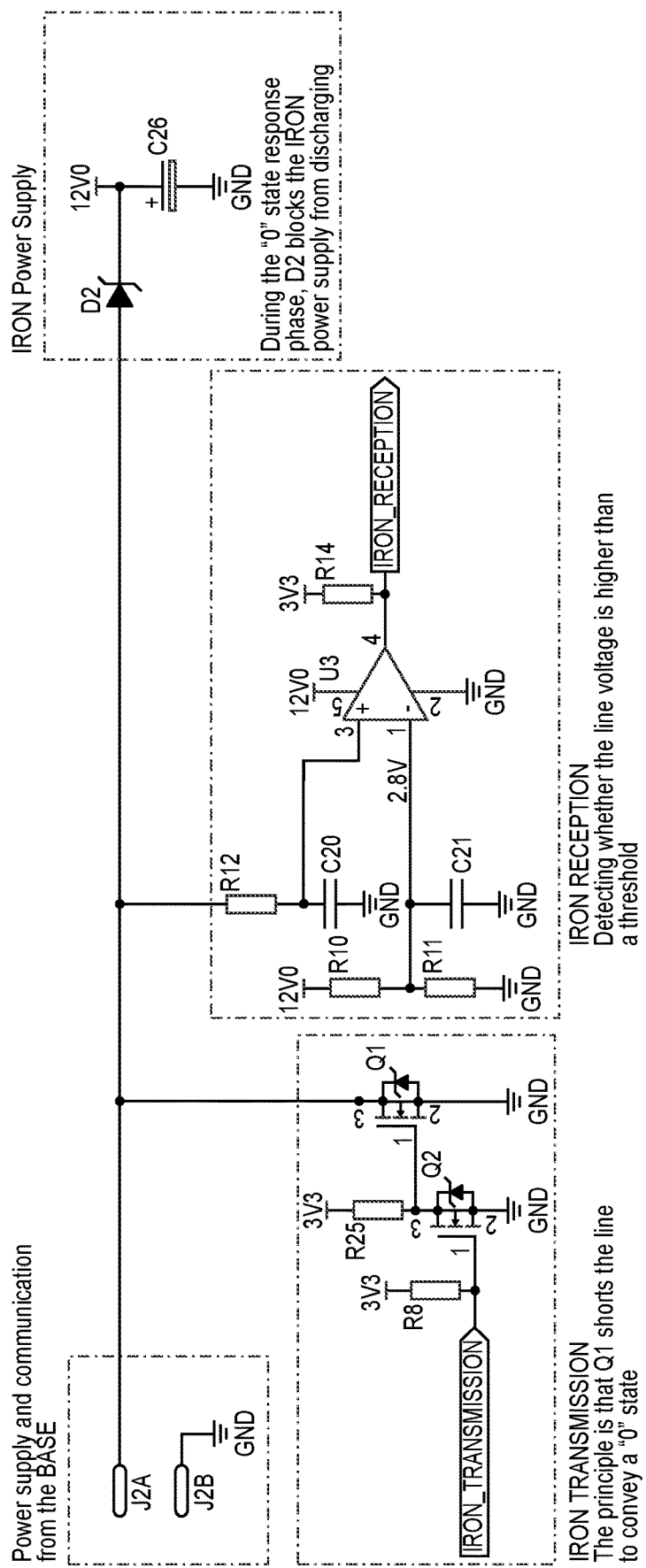

FIGS. 2 and 3 illustrate examples of electronic circuits used in the system according to the invention, when applied to the field of ironing. FIG. 2 illustrates the circuit of the base, and FIG. 3 illustrates that of the iron.

In the base (FIG. 2), a current limiter is used with the second set of conductive wires (second and third electrical lines).

During the transmission of the data, the limiter is active only for transmitting a "0" state.

For transmitting a state, the iron and the base operate in the same way.

Transmission of a "0" state=short circuit (i.e. 0 V)

Transmission of a "1" state=Q1 or Q9 open (for example 5 V or 12 V).

For receiving, the iron and the base operate in the same way.

A comparator detects whether the level on the line is "high" (="1") or "low" ("0").

In the iron, the "IRON Power Supply" part ensures that during the communication, the capacitor C26 does not discharge via the line short circuit.

The HV may be controlled by the base or by the iron.

The steam generator, and more generally the base, may be controlled by acting only on the iron, for example on the handle.

It goes without saying that the invention is not limited to the abovementioned scenarios.

As indicated, it is not limited to ironing systems or steam-generating systems, but covers any household electrical system comprising an appliance connected to a base by a cord in which there are at least two sets of conductors, at least one of which provides two-way communication between the base and the appliance.

The invention claimed is:

1. A household electrical system comprising an appliance having an electric circuit, a base for the appliance, and a cord connecting the appliance with the base, the cord comprising:
    a first electrical line formed by a first set of conductive wires for high voltage transmission of an operating power of the appliance;
    a second electrical line formed by a second set of conductive wires for low voltage supply of power to the electric circuit;
    a third electrical line for providing two-way data transmission between the base and the appliance, the third electrical line being formed by the second set of conductive wires,
    wherein the system further includes,
    a modulator configured to modulate a voltage and/or a current through the second set of conductive wires to activate the second electrical line and the third electrical line, or to activate the third electrical line; and
    an independent electricity source configured to supply power to the electric circuit when the second electrical line is deactivated.

2. The system as claimed in claim 1, wherein the independent electricity source is a battery.

3. The system as claimed in claim 1, wherein the independent electricity source is a capacitor.

4. The system as claimed in claim 1, wherein the base includes a steam generator, and the appliance includes an iron.

5. The system as claimed in claim 1, wherein the appliance includes an actuator configured to be activated manually to control an operation of the base.

* * * * *